Jan. 8, 1963 A. G. SCHILBERG 3,072,441
VEHICLE AXLE
Filed May 20, 1959
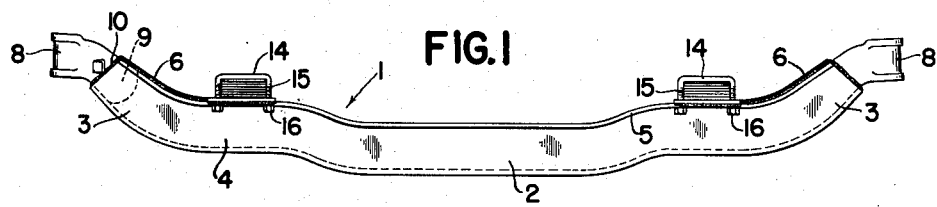
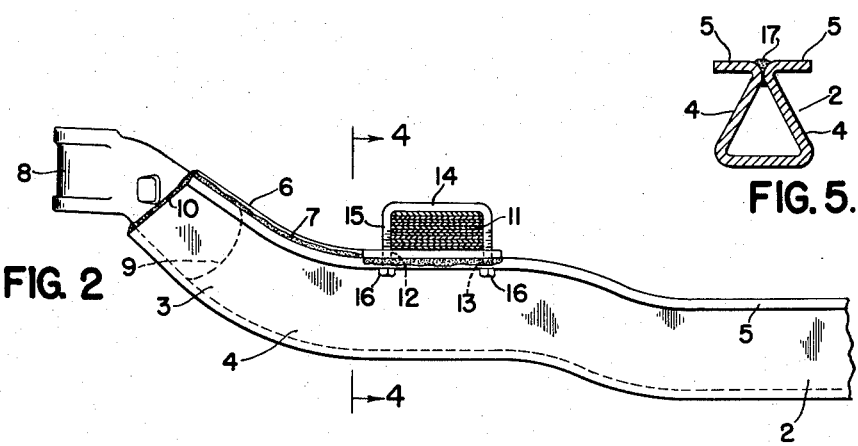
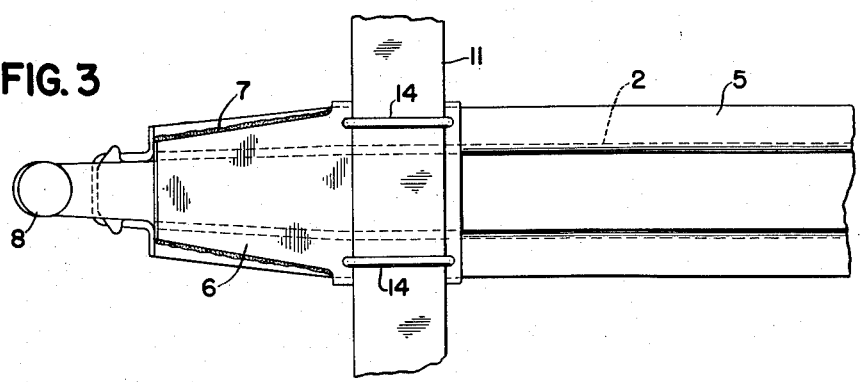
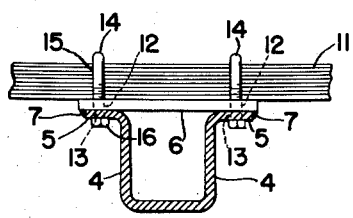
INVENTOR.
ARNOLD G. SCHILBERG
BY
Andrus & Starke
Attorneys

United States Patent Office 3,072,441
Patented Jan. 8, 1963

3,072,441
VEHICLE AXLE
Arnold G. Schilberg, Milwaukee, Wis., assignor to A. O. Smith Corporation, Milwaukee, Wis., a corporation of New York
Filed May 20, 1959, Ser. No. 814,523
1 Claim. (Cl. 301—124)

This invention relates to vehicle axles and particularly to axles formed principally of pressed metal members.

In the design of vehicles and particularly trucks and other cargo or freight carrying wheeled members, the recent trend has been to reduce vehicle weight while maintaining, and in many cases increasing vehicle payload. This trend has been largely dictated by legislative, economic and performance requirements and has led, on the one hand, to renewed efforts to replace the conventional forged axle with one of lighter weight. Weight savings effected in this area are especially important inasmuch as the axle represents unsprung weight.

Heretofore it has been proposed to fabricate the axle of light gauge pressed metal members secured together as by welding. Tubular and box-shaped axles of this construction have been proposed in the past and have compared favorably in strength to the forged axle. Generally, however, the cost of these light gauge axles has been relatively high and despite the saving in weight represented thereby, replacement of the forged axle has not been economically warranted.

In the present invention, a pressed metal axle is provided which achieves a more favorable balance between weight and cost, making the axle commercially acceptable. According to the invention, the axle is comprised of a one piece pressed axle beam having a flanged, channel-shaped cross-section and upwardly formed end portions. The axle beam opens upwardly with the end portions being closed and reinforced by a contoured plate welded to the opposed beam flanges. The end plates terminate in horizontally disposed inner end portions adapted to serve as spring seats or perches for the leaf springs of the spring suspension system.

The axle supports rotatable turnable wheels through knuckle pieces welded into the closed axle beam end portions.

The particular beam section of the invention permits the beam to be formed in one operation of a press, thus reducing cost. Furthermore, a somewhat lighter beam is possible, as compared to a tubular axle of like size for instance, due to more efficient utilization of beam material.

The accompanying drawing illustrates the best mode presently contemplated of carrying out the invention.

In the drawing:
FIG. 1 is a side elevation of the axle of the invention;
FIG. 2 is an enlarged fragmentary view of the axle of FIG. 1;
FIG. 3 is a fragmentary top plan view of the axle of FIG. 2;
FIG. 4 is a view taken along line 4—4 of FIG. 2; and
FIG. 5 is a cross-sectional view of an embodiment of the axle taken along a line at the beam mid-section.

The axle 1 of the invention includes a generally channel-shaped axle beam 2 having upwardly contoured end portions 3. The channel legs 4 of beam 2 extend upwardly and are turned outwardly to form a pair of parallel flanges 5. As shown in FIG. 3, flanges 5 are of maximum lateral extent at the midsection of the beam and are tapered inwardly toward either end of the beam to eliminate flange material having no appreciable load bearing function.

Beam 2 is an integral structure and is adapted to be formed in a suitable press from a relatively thin gauge sheet metal blank. Due to the particular section of the beam, only one pressing operation is required.

Contoured end portions 3 are designed to withstand torsion occurring during braking and are reinforced by a contoured end plate 6 supported at each end of the beam 2 on flanges 5 and secured thereto by the welds 7. Plates 6 provide a box-like enclosure with beam 2 for the reception of the knuckle pieces 8 extending from either end of the beam. Knuckle pieces 8 are formed with integral shanks 9 which extend into the ends of the beam and are secured to beam 2 by a continuous weld 10. Either Elliott or reverse Elliott type knuckle pieces may be used as desired. For illustrative purposes only, a reverse Elliott type knuckle is shown in the drawing. Each knuckle piece 9 is adapted to turnably support a wheel through suitable structure known in the art.

As best shown in FIGS. 2 and 3, plate 6 is widened at its inner end portion to conform generally to the width of beam 2 and is disposed in a horizontal position on the beam. The inner end portion of each plate 6 serves as a seat for leaf spring 11 disposed between the supported vehicle body (not shown) and beam 2 with the spring extending transversely of the beam.

To secure springs 11 on their associated plates 6, the latter are provided with a pair of longitudinally spaced openings 12 along each plate side, adapted to overlie corresponding openings 13 provided in flanges 5. A downwardly opening U-bolt 14 encloses spring 11 with the threaded legs or shanks 15 of the U-bolt extending downwardly through the aligned openings 12 and 13. A nut 16 carried on the lower end of each U-bolt leg 15 and engageable with the underside of flange 5 secures the spring tightly against the beam.

The portion of beam 2 between springs 11 requires no additional reinforcing inasmuch as the load in torsion resulting from braking is carried entirely by the portion of the axle fom the springs outboard.

According to an embodiment of the invention and with reference to FIG. 5, axle beam 2 is pinched together between plates 6 as by a lateral force applied along the upper extent of each channel side leg 4. The channel legs are formed angularly inwardly and into contact adjacent their upper ends to provide a closed beam with channel flanges 5 moved correspondingly inwardly. A weld 17 disposed along the line of contact between legs 4 secures the latter rigidly together. Immediately inboard of plates 6, channel legs 4 separate and in a short transitional distance defined at the outboard limit by the inner edge of plates 6, return to their normal vertical position to form beam ends identical to the earlier described structure.

The structure of the embodiment provides a reduced width through the beam mid-section which is desirable for applications wherein due to the location of vehicle components clearance with the axle beam would be difficult or impossible to achieve with a wide beam construction. Moreover, the beam of the embodiment has improved torsional resistance as compared to the beam of FIGS. 1–4 while providing the same characteristics under non-torsional or bending loads.

It is preferred to heat treat the axle of the invention after assembly thereof to achieve predetermined strength and metallurgical characteristics enabling the axle to compare with prior art axles strength-wise despite its light weight.

With the flanged construction of beam 2, the need for affixing separate brackets or flanges to the beam to support a spring seat is obviated thereby eliminating an assembly operation and reducing the cost of the axle.

In addition due to the particular cross-sectional area of beam 2, the axle is able to withstand greater bending moments as compared to a tubular section axle, for example, of corresponding height, depth and gauge.

This advantage is attributable to the fact that in the present invention there is a greater proportion of the available beam material disposed at the upper and lower limit of the beam and hence farther from the neutral axis thereof where it is better able to withstand bending loads.

The axle of the invention is inexpensive of manufacture as the main member or axle beam therefor is adapted to be formed substantially into finished form in a single operation of a press and is configured to provide integral spring seat supports. The axle beam requires no accurate alignment of the structural members such as in the case of a box-shaped beam formed of two channel members joined along their opposed flanges.

Moreover, the axle is relatively light weight yet comparable in strength to axles heretofore utilized.

Various modes of carrying out the invention are contemplated as being within the scope of the following claim particularly pointing out and distinctly claiming the subject matter which is regarded as the invention.

I claim:

An axle for a vehicle, comprising an integral pressed metal axle beam of inverted flanged channelled sectional area having a bottom wall, side walls extending generally upwardly along the opposed edges of said bottom wall and flanges extending laterally outwardly of the upper edge of each of said side walls, said beam having upwardly contoured end portions and a substantially horizontally extending mid-section, the side walls of said axle beam being disposed in parallel vertically extending relation at the end portions of said beam and merging upwardly between said end portions and secured together along their line of merger to provide a closed sectional area in the beam mid-section of reduced width, a reinforcing plate supported on and secured to the opposed flanges of said beam at the end portions thereof to rigidify the beam ends and to provide box-like enclosures at each end of the beam, a steering knuckle adapted to support the steerable road wheels of the vehicle and secured in outwardly extending relation within the end portions of said beam, and spring means mounted across the inner end of each of said reinforcing plates for springing the associated body structure of the vehicle from the axle.

References Cited in the file of this patent

UNITED STATES PATENTS

| | | |
|---|---|---|
| 1,200,305 | Brush | Oct. 3, 1916 |
| 1,654,107 | Andren | Dec. 27, 1927 |
| 1,908,335 | Evans | May 9, 1933 |
| 2,115,913 | Hicks | May 3, 1938 |
| 2,126,090 | Byron | Aug. 9, 1938 |
| 2,194,356 | Eklund | Mar. 19, 1940 |
| 2,411,836 | Seckel | Nov. 26, 1946 |
| 2,624,430 | Macomber | Jan. 6, 1953 |

FOREIGN PATENTS

| | | |
|---|---|---|
| 477,551 | Great Britain | Jan. 3, 1938 |
| 172,121 | Austria | Aug. 11, 1952 |